United States Patent
Alletzhauser

(10) Patent No.: US 7,966,827 B2
(45) Date of Patent: Jun. 28, 2011

(54) GAS TURBINE ENGINE WITH FAN VARIABLE AREA NOZZLE HAVING A ROTATIONAL VALVE SYSTEM

(75) Inventor: Eric W. Alletzhauser, Madison, CT (US)

(73) Assignee: United Technologies Corporation, Hartford, CT (US)

( * ) Notice: Subject to any disclaimer, the term of this patent is extended or adjusted under 35 U.S.C. 154(b) by 1320 days.

(21) Appl. No.: 11/755,757

(22) Filed: May 31, 2007

(65) Prior Publication Data
US 2009/0064659 A1    Mar. 12, 2009

(51) Int. Cl.
*F02K 1/00* (2006.01)
(52) U.S. Cl. .......................... 60/770; 60/785
(58) Field of Classification Search .............. 60/226.1, 60/226.3, 235, 242, 770, 771, 785
See application file for complete search history.

(56) References Cited

U.S. PATENT DOCUMENTS

| | | | |
|---|---|---|---|
| 4,044,973 A | 8/1977 | Moorehead | |
| 4,086,761 A * | 5/1978 | Schaut et al. | 60/226.1 |
| 4,147,027 A | 4/1979 | Greathouse | |
| 4,205,813 A | 6/1980 | Evans et al. | |
| 4,301,980 A | 11/1981 | Bradfield et al. | |
| 4,410,150 A | 10/1983 | Lahti | |
| 4,466,587 A | 8/1984 | Dusa et al. | |
| 4,505,443 A | 3/1985 | Bradfield et al. | |
| 5,315,821 A | 5/1994 | Dunbar et al. | |
| 5,722,231 A | 3/1998 | Porte | |
| 5,743,488 A | 4/1998 | Rolston et al. | |
| 5,806,302 A | 9/1998 | Cariola et al. | |
| 6,318,070 B1 | 11/2001 | Rey et al. | |
| 6,439,840 B1 | 8/2002 | Tse | |
| 6,505,706 B2 | 1/2003 | Tse | |
| 6,543,224 B1 | 4/2003 | Barooah | |
| 6,640,537 B2 | 11/2003 | Tse | |
| 6,718,752 B2 | 4/2004 | Nesbitt et al. | |
| 6,748,744 B2 | 6/2004 | Peplow et al. | |
| 6,786,038 B2 * | 9/2004 | Lair | 60/226.1 |
| 6,813,877 B2 | 11/2004 | Birch et al. | |
| 6,820,410 B2 | 11/2004 | Lair | |
| 6,983,588 B2 | 1/2006 | Lair | |
| 7,000,378 B2 | 2/2006 | Birch et al. | |
| 7,043,898 B2 | 5/2006 | Rago | |
| 7,055,329 B2 | 6/2006 | Martens et al. | |
| 7,093,423 B2 | 8/2006 | Gowda et al. | |

OTHER PUBLICATIONS

PCT Patent Application No. PCT/2006/39049, Fan Variable Area Nozzle With Cable Actuator System, filed Oct. 12, 2006.
PCT Patent Application No. PCT/2006/39794, Gas Turbine Engine With Axial Movable Fan Variable Area Nozzle, filed Oct. 12, 2006.
PCT Patent Application No. PCT/2006/39796, Gas Turbine Engine With Louvered Fan Variable Area Nozzle, filed Oct. 12, 2006.
PCT Patent Application No. PCT/2006/39948, Fan Variable Area Nozzle With Adaptive Structure, filed Oct. 12, 2006.

(Continued)

*Primary Examiner* — Michael Cuff
*Assistant Examiner* — Andrew Nguyen
(74) *Attorney, Agent, or Firm* — Carlson Gaskey & Olds PC

(57) ABSTRACT

A turbofan engine includes a fan variable area nozzle having a multiple of vents through a fan nacelle and rotatable elements rotatable within the vents by an actuator system. Rotation of the rotatable element within each vent changes the effective area of the fan nozzle exit area to permit efficient operation at a multiple of flight conditions.

14 Claims, 4 Drawing Sheets

OTHER PUBLICATIONS

PCT Patent Application No. PCT/2006/39953, Fan Variable Area Nozzle With Electromechanical Actuator, filed Oct. 12, 2006.
PCT Patent Application No. PCT/2006/39989, Gas Turbine Engine With Circumferential Sleeved Fan Variable Area Nozzle, filed Oct. 12, 2006.
PCT Patent Application No. PCT/2006/40248, Gas Turbine Engine With Rotationally Overlapped Fan Variable Area Nozzle, filed Oct. 12, 2006.
PCT Patent Application No. PCT/2006/40249, Gas Turbine Engine Fan Variable Area Nozzle With Swivalable Insert System, filed Oct. 12, 2006.
PCT Patent Application No. PCT/2006/40250, Fan Variable Area Nozzle Positional Measurement System, filed Oct. 12, 2006.
PCT Patent Application No. PCT/2006/40251, Gas Turbine Engine Bifurcation Located Fan Variable Area Nozzle, filed Oct. 12, 2006.
PCT Patent Application No. PCT/2007/63255, Fan Variable Area Nozzle for a Gas Turbine Engine Fan Nacelle With Drive Ring Actuation System, filed Mar. 5, 2007.
PCT Patent Application No. PCT/2006/39936, Fan Variable Area Nozzle for a Gas Turbine Engine Fan Nacelle With Sliding Actuation System, filed Oct. 12, 2006.

\* cited by examiner

GAS TURBINE ENGINE WITH FAN VARIABLE AREA NOZZLE HAVING A ROTATIONAL VALVE SYSTEM

BACKGROUND OF THE INVENTION

The present invention relates to a gas turbine engine, and more particularly to a turbofan engine having a fan variable area nozzle (FVAN) which selectively opens vents through a fan nacelle to change a bypass flow path area thereof.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between a fan nacelle and a core nacelle. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency therefrom may be negated.

Accordingly, it is desirable to provide an effective, lightweight fan variable area nozzle for a gas turbine engine.

SUMMARY OF THE INVENTION

A turbofan engine according to the present invention includes a fan variable area nozzle having a multiple of vents through a fan nacelle. Rotatable elements are rotatable within the vents by an actuator system. The vents selectively change the effective fan nozzle exit area to permit efficient operation at predefined flight conditions. The vents are closed to define a nominal fan nozzle exit area and are opened during other flight conditions such as landing and takeoff.

The present invention therefore provides an effective, lightweight fan variable area nozzle for a gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE DISCLOSED EMBODIMENT

Figure 1:
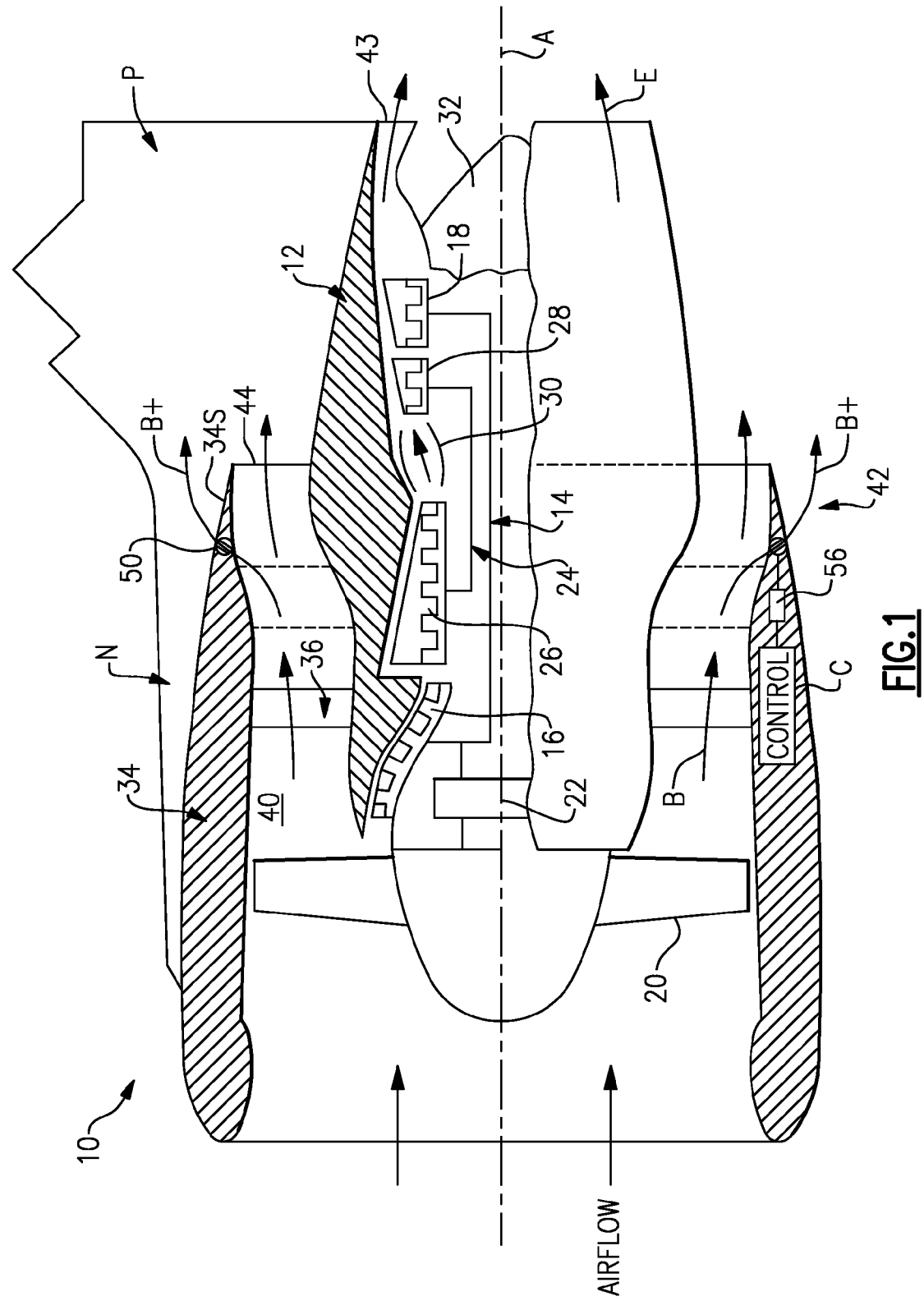
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N as is typical of an aircraft designed for subsonic operation.

The turbofan engine 10 includes a core section within a core nacelle 12 that houses a low spool 14 and high spool 24. The low spool 14 includes a low pressure compressor 16 and low pressure turbine 18. The low spool 14 drives a fan section 20 directly or through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in the disclosed embodiment is a high-bypass geared turbofan aircraft engine in which the engine 10 bypass ratio is greater than ten (10), the turbofan diameter is significantly larger than that of the low pressure compressor 16, and the low pressure turbine 18 has a pressure ratio that is greater than five (5). The gear train 22 may be an epicycle gear train such as a planetary gear system or other gear system with a gear reduction ratio of greater than 2.5. It should be understood, however, that the above parameters are only exemplary of one geared turbofan engine and that the present invention is likewise applicable to other gas turbine engines including direct drive turbofans.

Airflow enters a fan nacelle 34, which at least partially surrounds the core nacelle 12. The fan section 20 communicates airflow into the core nacelle 12 for compression by the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with respective spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by structure 36 often generically referred to as an upper and lower bifurcation. A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular bypass flow path 40 and is discharged from the engine 10 through a fan variable area nozzle (FVAN) 42 which defines a nozzle exit area 44 between the fan nacelle 34 and the core nacelle 12 at a segment 34S of the fan nacelle 34 downstream of the fan section 20.

Thrust is a function of density, velocity, and area. One or more of these parameters can be manipulated to vary the amount and direction of thrust provided by the bypass flow B. The FVAN 42 includes a vent system 50 within the fan nacelle 34 to effectively vary the area of the fan nozzle exit area 44 and selectively adjust the pressure ratio of the bypass flow B in response to a controller C.

A significant amount of thrust is provided by the bypass flow B due to the high bypass ratio. The fan section 20 of the engine 10 is preferably designed for a particular flight condition—typically cruise at 0.8 M and 35,000 feet. As the fan section 20 is efficiently designed at a particular fixed stagger angle for an efficient cruise condition, the vent system 50 is operated to effectively vary the fan nozzle exit area 44 to adjust fan bypass air flow such that the angle of attack or incidence on the fan blades is maintained close to the design incidence for efficient engine operation at other flight conditions, such as landing and takeoff. This provides optimized engine operation over a range of flight conditions with respect to performance and other operational parameters such as noise levels. The vent system 50 may provide an approximately 20% (twenty percent) change in area of the fan exit nozzle area 44. It should be understood that other arrangements as well as essentially infinite intermediate positions are likewise usable with the present invention.

Figure 2A:
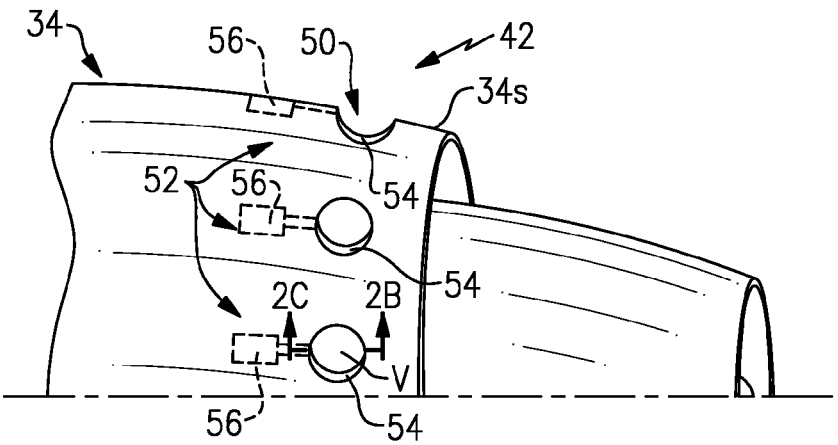
FIG. 2A is a perspective side view of a fan nacelle with a multiple of circumferentially distributed vents which provide a fan variable area nozzle, each of the vents having a single semi-spherical element illustrated in an open position.

Referring to FIG. 2A, the vent system 50 generally includes a multiple of vents 52 each having a valve 54 rotatable therein by an actuator system 56. The vents 52 are located circumferentially about the fan nacelle 34 within the fan end segment 34S downstream of the fan section 20. The vents 52 may be equally spaced or unequally spaced to avoid structures such as pylon P. The fan end segment 34S is located adjacent an aft most end segment of the fan nacelle 34, however, the vents 52 may likewise be located in other segments of the fan nacelle 34. Although illustrated as generally circular openings, it should be understood that the vents 52 may be of various sizes and shapes including, for example only, rectilinear, elliptical, airfoil, and such like. The vents 52 may also include a structure which directs and smoothes the airflow therethrough as well as reduces noise generation by introducing randomness in the flow stream to break the otherwise discrete vortical structures and minimize edge tones therefrom.

The bypass flow B is effectively altered by opening and closing the additional flow area provided by the vents 52. The vent system 50 changes the physical area and geometry of the bypass flow path 40 during particular flight conditions. For example only, the vents 52 are closed to define a nominal converged position for the fan nozzle exit area 44 during cruise and are opened for other flight conditions such as landing and takeoff.

Figure 2B:
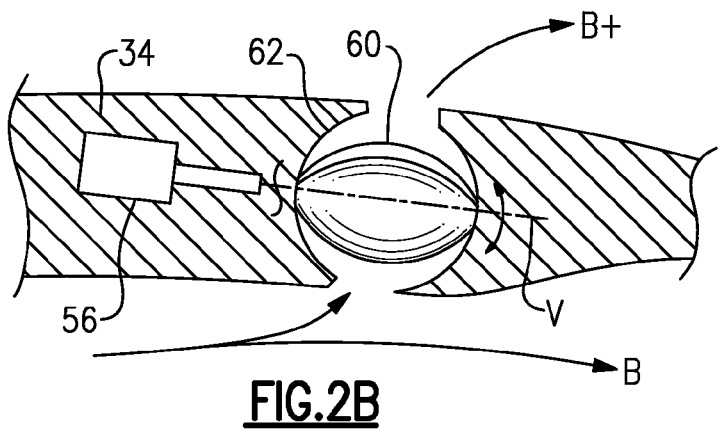
FIG. 2B is a sectional view of a single vent of the FVAN illustrated in FIG. 2A shown in an open position.
Figure 2C:
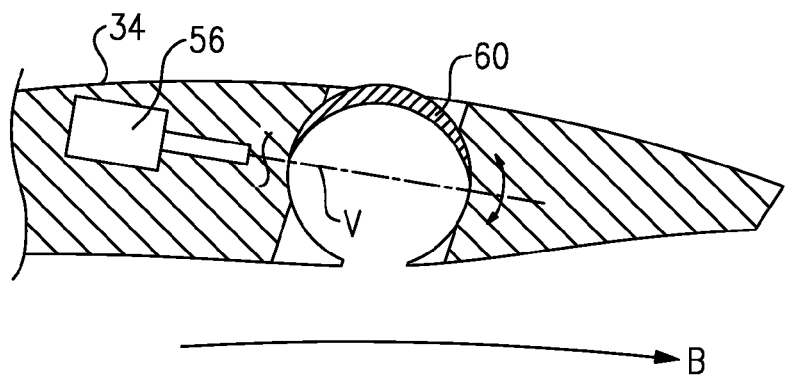
FIG. 2C is a sectional view of a single vent of the FVAN illustrated in FIG. 2A shown in a closed position.
Figure 3A:
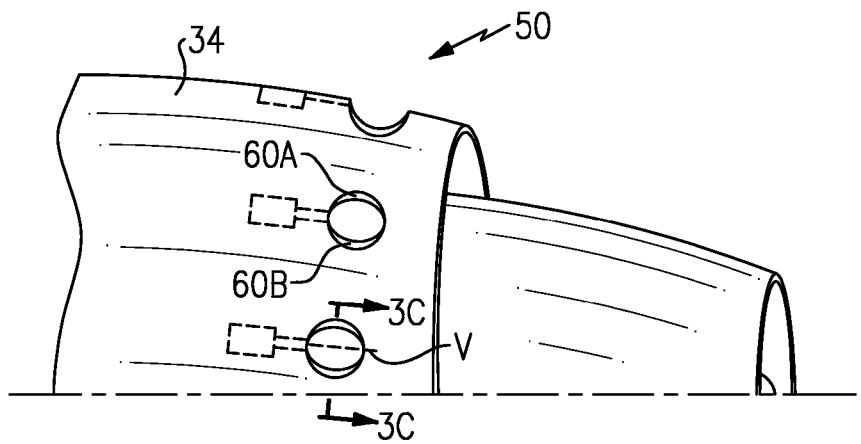
FIG. 3A is a perspective side view of a fan nacelle with a multiple of circumferentially distributed vents which provide a fan variable area nozzle, each of the vents having a multiple of semi-spherical elements illustrated in an open position.
Figure 3B:
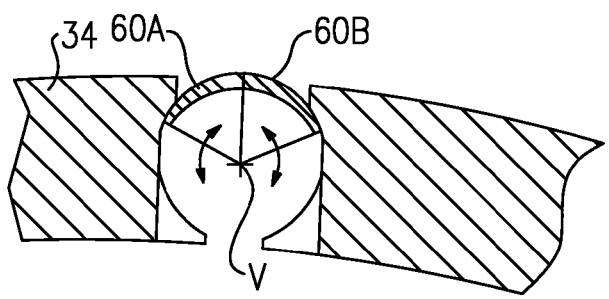
FIG. 3B is a front sectional view of a single vent of the FVAN illustrated in FIG. 3A shown in an open position.
Figure 3C:
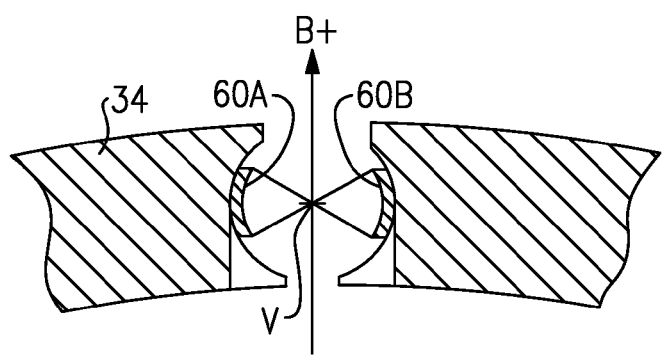
FIG. 3C is a front sectional view of a single vent of the FVAN illustrated in FIG. 3A shown in a closed position.

Referring to FIG. 2B, each valve 54 includes an at least partially semi-spherical element 60 which rotates about an axis V within a corresponding socket 62 which at least partially defines the vent 52. That is, the semi-spherical element 60 may form a shell structure which rotates within the socket 62 to selectively rotate between an open position (FIG. 2B) and a closed position (FIG. 2C). The valve 54 may alternatively or additionally include a multiple of portions 60A, 60B (FIG. 3A) which rotate within the corresponding socket 62 between an open position (FIG. 3B) and a closed position (FIG. 3C).

Figure 4A:
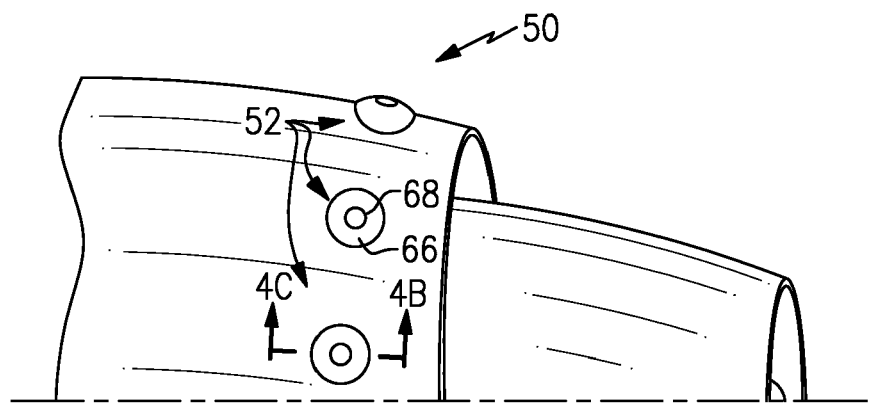
FIG. 4A is a perspective side view of a fan nacelle with a multiple of circumferentially distributed vents which provide a fan variable area nozzle, each of the vents having a ball valve illustrated in an open position.
Figure 4C:
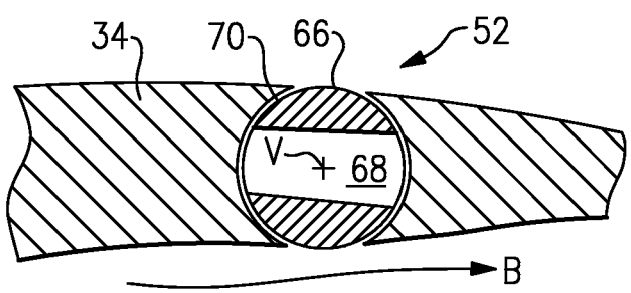
FIG. 4C is a sectional view of a single vent of the FVAN illustrated in FIG. 4A shown in a closed position.
Figure 4B:
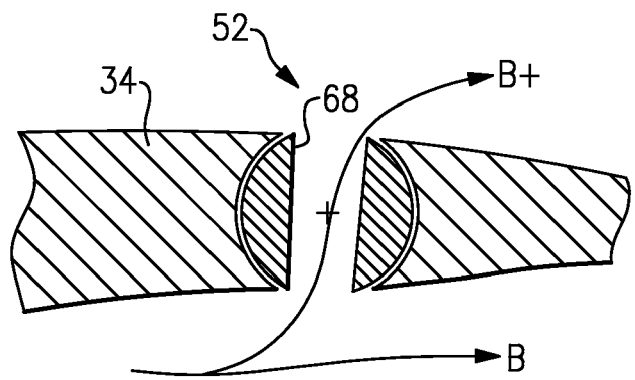
FIG. 4B is a sectional view of a single vent of the FVAN illustrated in FIG. 4A shown in an open position.

Referring to FIG. 4A, the valve 54 may alternatively include a ball valve 66 having an opening 68 therethrough which rotates about an axis V within a corresponding socket 70 which at least partially defines the vent 52. The ball valve 66 rotates between an open position (FIG. 4B) and a closed position (FIG. 4C) in response to the actuator system 56. It should be understood that various linkages may be utilized with the actuator system to provide the desired movement. Also, the linkage system may include a fail-safe system to assure that the valve fail safes to the open or take-off/landing position.

In operation, the vent system 50 communicates with the controller C to rotate the valves 54 and effectively vary the fan nozzle exit area defined by the fan nozzle exit area 44. Other control systems including an engine controller or an aircraft flight control system may also be usable with the present invention. By adjusting the entire periphery of the FVAN 42 in which all segments are moved simultaneously, engine thrust and fuel economy are maximized during each flight regime by varying the fan nozzle exit area. By separately adjusting only particular valves 54 within the vent system 50 to provide an asymmetrical fan nozzle exit area 44, engine bypass flow is selectively vectored to provide, for example only, trim balance, thrust controlled maneuvering, enhanced ground operations and short field performance. The controller C may rotate the valves 54 to full open, full closed or to any intermediate position between full open and full closed.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A nacelle assembly for a gas turbine engine comprising:
   a core nacelle defined about an axis;
   a fan nacelle mounted at least partially around said core nacelle, said fan nacelle having a multiple of semi-spherical vents between a radially inner surface and a radially outer surface of the fan nacelle in communication with a fan bypass flow;
   a valve rotationally mounted at least partially within each of said multiple of vents to vary an airflow through a fan nozzle exit area; and
   wherein each valve defines a semi-spherical member rotatable about an axis.

2. The assembly as recited in claim 1, wherein each valve has a multiple of sections rotatable about an axis.

3. The assembly as recited in claim 1, wherein each valve includes a ball valve having an opening therethrough, said ball valve rotatable about an axis.

4. The assembly as recited in claim 1, wherein each valve defines an outer surface contour which is at least partially spherical and is rotatably received within a socket which at least partially defines said vent.

5. The assembly as recited in claim 1, further comprising an actuator system which rotates each of said valves.

6. The assembly as recited in claim 1, further comprising an actuator system which independently rotates each of said valves.

7. The assembly as recited in claim 1, wherein each of said multiple of vents defines a socket for a respective valve which is received therein.

8. The assembly as recited in claim 1, wherein each of said valves includes a spherical contour.

9. The assembly as recited in claim 1, wherein said multiple of vents are circumferentially distributed about said fan nacelle.

10. The assembly as recited in claim 1, wherein said multiple of vents are circumferentially distributed about said fan nacelle, adjacent to a trailing edge thereof.

11. A gas turbine engine comprising:
    a core section defined about an axis;
    a fan section driven by said core section about said axis;
    a core nacelle defined at least partially about said core section;
    a fan nacelle mounted at least partially around said core nacelle, said fan nacelle having a multiple of semispherical vents between a radially inner surface and a radially outer surface of the fan nacelle and circumferentially distributed about said fan nacelle in communication with a fan bypass flow;
    a valve rotationally mounted within each of said multiple of vents, each of said valves defines an outer surface contour which is at least partially spherical and is rotatably received within a socket which at least partially defines said vent; and
    an actuator system which rotates each of said valves to vary an airflow through a fan nozzle exit area.

12. The engine as recited in claim 11, wherein said actuator system independently rotates each of said valves.

13. The engine as recited in claim 12, further comprising a controller in communication with said actuator system to vary said fan nozzle exit area in response to a flight condition.

14. The engine as recited in claim 12, further comprising a controller in communication with said actuator system to asymmetrically vary said fan nozzle exit area in response to a flight condition

* * * * *